Figure 1A:
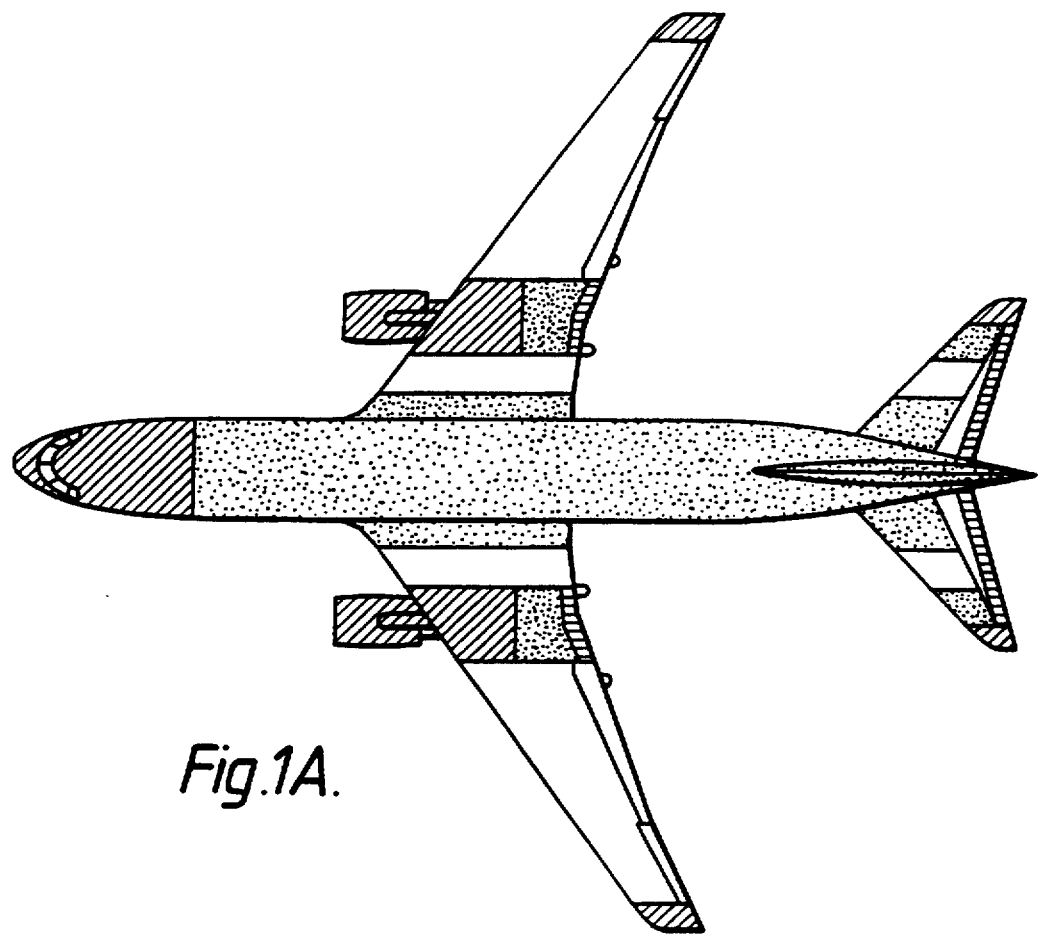

United States Patent [19]

Arnold et al.

[11] Patent Number: 5,417,385
[45] Date of Patent: May 23, 1995

[54] STRUCTURAL COMPONENT

[75] Inventors: Michael J. Arnold, Bangor; Charles E. Douglas, Belfast; Arthur B. Hamill, Carnhoney, all of Ireland

[73] Assignee: Short Brothers PLC, Belfast, Scotland

[21] Appl. No.: 133,150

[22] PCT Filed: Apr. 9, 1992

[86] PCT No.: PCT/GB92/00636
§ 371 Date: Oct. 12, 1993
§ 102(e) Date: Oct. 12, 1993

[87] PCT Pub. No.: WO92/18951
PCT Pub. Date: Oct. 29, 1992

[30] Foreign Application Priority Data

Apr. 12, 1991 [GB] United Kingdom ............... 9107766

[51] Int. Cl.⁶ .................................................. B64D 45/02
[52] U.S. Cl. ................................... 244/1 A; 361/218; 244/119
[58] Field of Search .............. 244/1 A, 117 R, 119, 244/133, 121; 361/218, 217, 216

[56] References Cited

U.S. PATENT DOCUMENTS

| 4,198,454 | 4/1980 | Norton | 428/117 |
| 4,349,859 | 9/1982 | Sanders | 361/218 |
| 4,402,779 | 9/1983 | Levy | 244/133 |
| 4,542,056 | 9/1985 | Anglin et al. | 428/116 |
| 4,599,255 | 7/1986 | Anglin et al. | 428/73 |
| 4,767,656 | 8/1988 | Chee et al. | 244/133 |
| 4,888,451 | 12/1989 | Toni et al. | 244/131 |
| 5,127,601 | 7/1992 | Schroeder | 244/1 A |

FOREIGN PATENT DOCUMENTS

| 384189 | 10/1987 | Austria . |
| 2.112337A | 6/1972 | France . |
| 3419192A | 11/1985 | Germany . |
| 1342898 | 10/1971 | United Kingdom . |
| 2197820 | 6/1988 | United Kingdom . |

Primary Examiner—Galen L. Barefoot
Attorney, Agent, or Firm—Lyon & Lyon

[57] ABSTRACT

A structural component exposed to lightning strikes comprises a bonded assembly of a first component part (18) which has a cellular structure and a front face (20) and a second component part (22) extending across the front face (20) of the first component part (18), the second component part (22) comprising an electrically conducting first sheet (23), an electrically non-conductive second sheet (25) at the rear of the first sheet (23) and a fibre reinforced composite third sheet (26) at the rear of the second sheet (25) and positioned between the second sheet (25) and the front face (20) of the first component part (18). In one form, the electrically conducting first sheet (23) is a non-ferrous metal or metal alloy expanded foil, the electrically non-conducting second sheet (25) is a glass fibre fabric, the third sheet (26) is a carbon or graphite fibre reinforced composite sheet and the first component part (18) is an aluminium alloy honeycomb core.

15 Claims, 7 Drawing Sheets

WAVEFORM
COMPONENT A

WAVEFRONT
COMPONENT A

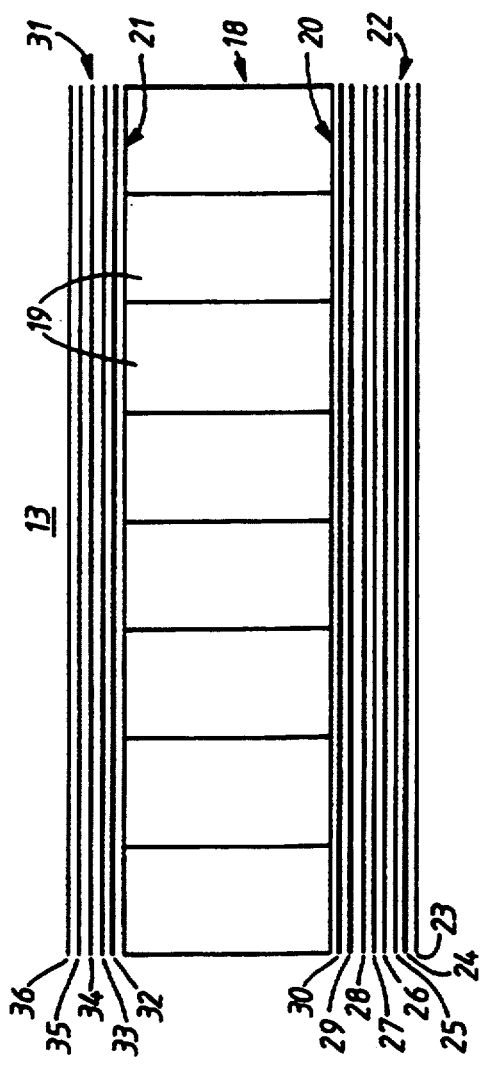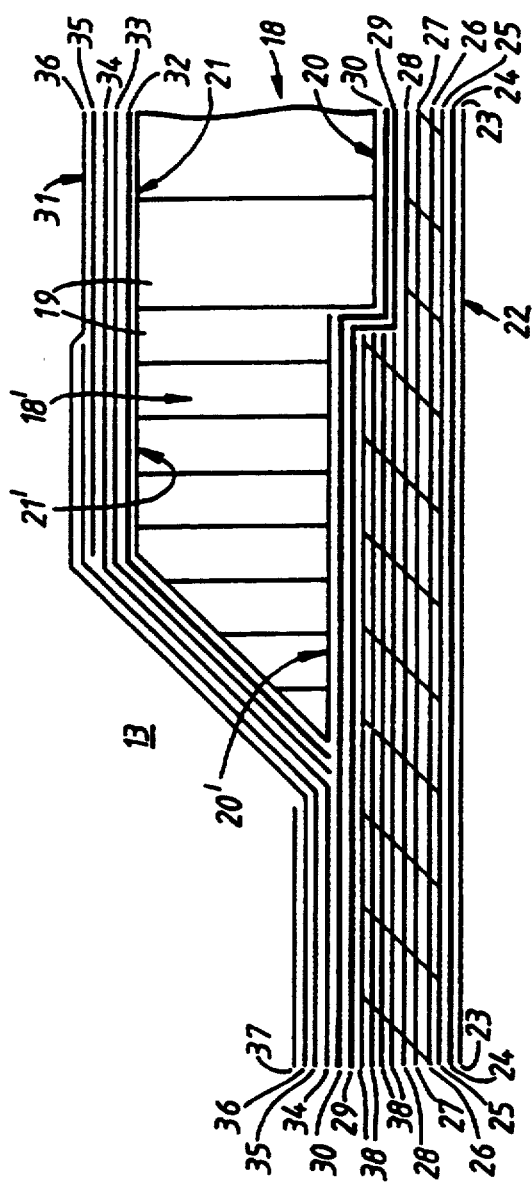

STRUCTURAL COMPONENT

The present invention relates to structural components and is particularly although not exclusively concerned with structural components which are manufactured from composite materials and which are used as aircraft surface structures for the airframe and for engine nacelles.

Aircraft flying in and around thunderstorms are often subject to direct lightning strikes, which can produce severe damage, depending on the intensity of the strike and the construction of the structural component affected.

Electrical currents induced into the structural component create voltage differences and electromagnetic fields, which induce transient voltages and currents in systems wiring and hardware shielded by the component. This is particularly damaging in an aircraft engine environment where, on modern aircraft, engines are electronically controlled.

An aim therefore is to provide a structural component which will resist full penetration from a primary lightning strike, thereby protecting any electrical equipment shielded by it from the indirect effects of transient voltages and, by having a component free from overall penetration, against further adverse effects of high intensity radiated fields (HIRF).

With modern aircraft, where composite materials in which carbon or graphite fibres are used, the difficulty of providing equivalent protection when compared with an all metal structure are magnified due to the lower electrical conductivity of the carbon or graphite.

The various airworthiness certification authorities lay down standards to which aircraft manufactures must comply. Based on the probability of a lightning strike and the probable intensity of the lightning current generated in the strike, the authorities designate different potential strike zones for each aircraft and the probable current waveforms to which structures and systems in these zones must be resistant. These are identified as Zones 1A and 1B, Zones 2A and 2B and Zone 3 and current components A, B, C and D. The zones have been defined as follows:

Zone 1A - All areas of the aircraft surfaces where there is a high possibility of an initial lightning attachment with a low possibility of flash hang-on.

Zone 1B - All areas of the aircraft surfaces where there is a high possibility of an initial lightning attachment and a high possibility of flash hang-on.

Zone 2A - All areas of the aircraft surfaces where there is a high possibility of a lightning attachment being swept on to the area from a Zone 1A but having a low possibility of flash hang-on.

Zone 2B - All areas of the aircraft surface where there is a high possibility of a lightning attachment being swept on to the area from a Zone 1A but having a high possibility of flash hang-on.

Those surfaces not in zones 1 and 2 are said to be in Zone 3 where there is a low possibility of any attachment of the lightning channel. Zone 3 includes those portions of the aircraft which lie within, beneath, or between the other zones and which conduct substantial amounts of electrical current between direct or swept-stroke attachment points.

The location of strike zones on any aircraft is dependent on the geometry of the aircraft and operational factors, and often varies from one aircraft to another.

The four current components (A, B, C and D) are specified to determine direct effects under tests. Components A, B, C and D each simulate a different characteristic of the current in a natural lightning strike. Component A is a first return stroke current, component B is an intermediate current, component C is a continuing current, and component D is a restrike current.

It is an object of the present invention to provide a structural component which can be manufactured at least in part from composite materials and which provides improved zone 1A current component A and current component D protection.

It is a further object of the present invention to provide a structural component which can be manufactured at least in part from carbon, graphite or aramid fibre reinforced composite materials but which does not suffer from the disadvantages found in composite structural components hitherto proposed.

According to a first aspect of the present invention there is provided a structural component comprising an assembly of a first component part which has a cellular structure and a front face and a second component part extending across the front face of the first component part, the second component part comprising an electrically conducting first sheet, an electrically non-conducting second sheet at the rear of the first sheet and a fibre reinforced composite third sheet at the rear of the second sheet and positioned between the second sheet and the front face of the first component part.

In a preferred embodiment of the invention the second sheet adjoins the first sheet and the third sheet adjoins the second sheet.

Preferably, the electrically conducting first sheet of the second component part comprises a non ferrous metal or metal alloy expanded foil which may conveniently be made from an aluminium or copper alloy.

In a preferred embodiment of the invention, the second sheet of the second component part comprises a fabric constructed from electrically non-conducting fibres. The fibres are preferably glass fibres and the fabric is preferably in woven form.

In a preferred embodiment of the invention, the third sheet of the second component part is a carbon or graphite fibre reinforced composite sheet. Alternatively, an aramid fibre reinforced composite sheet may be used.

In a preferred embodiment of the invention hereinafter to be described, the third sheet of the second component part, which is in the form of a composite, is one of a plurality of superposed composite sheets in an arrangement in which the third sheet is foremost and adjoins the second sheet of the second component part.

In a preferred embodiment of the invention, the first component part is an electrically conducting part. It is preferably formed from a lightweight non ferrous metal or metal alloy. The metal alloy is preferably an aluminum alloy.

In its broadest aspect, the first component part may take any cellular form. Where the structural component is to be used in aircraft construction it conveniently takes the form of an open cell structure constituted by wall portions which extend across the component part from the front face to a rear face thereof and which provide bounding surfaces for an array of juxtaposed cells. Such a structure includes the commonly used open-ended honeycomb structures but also includes within its scope arrays of open ended cells of cross-section other than hexagonal.

In an embodiment of the invention hereinafter to be described the structural component includes a backing component part which extends across a rear face of the first component part and which comprises one or more superposed fibre reinforced composite sheets.

The structural component according to the first aspect of the invention preferably comprises a bonded assembly using adhesives and cocurring techniques.

According to a second aspect of the present invention there is provided an aircraft including a surface structure exposed to lightning strikes and formed by a structural component according to the first aspect of the invention, with the electrically conducting first sheet of the second component part providing an outermost face exposed to lightning strikes.

According to a third aspect of the present invention there is provided a method of manufacturing a structural component according to the first aspect of the invention comprising the steps of bonding the electrically non conducting second sheet to the fibre reinforced composite third sheet in a precuring step to form a precured facing sheet, and bonding the electrically conducting first sheet to the front face of the precured facing sheet and to form a facing sub-assembly.

In a preferred embodiment according to the third aspect of the invention, the electrically conducting first sheet is autoclave bonded to the precured facing sheet at a pressure in the range of 80–90 psi. Preferably, the electrically conducting first sheet is autoclave bonded to the precured facing sheet at a pressure of 85 psi.

The method according to a third aspect of the invention preferably includes the further step of bonding the sub-assembly to the front face of the first component part and an uncured backing assembly of composite sheets to a rear face of the first component part at a pressure in the range of 33 to 40 psi to form the structural component.

Figure 1B:
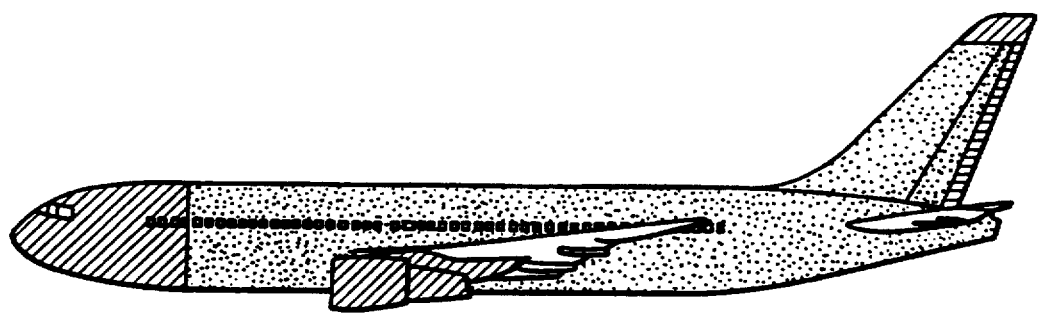

One embodiment of the invention will now be described by way of example with reference to the accompanying drawing in which:

FIGS. 1A and 1B are schematic plan and elevation views of an aircraft illustrating designated potential lightning strike zones.

Figure 2:
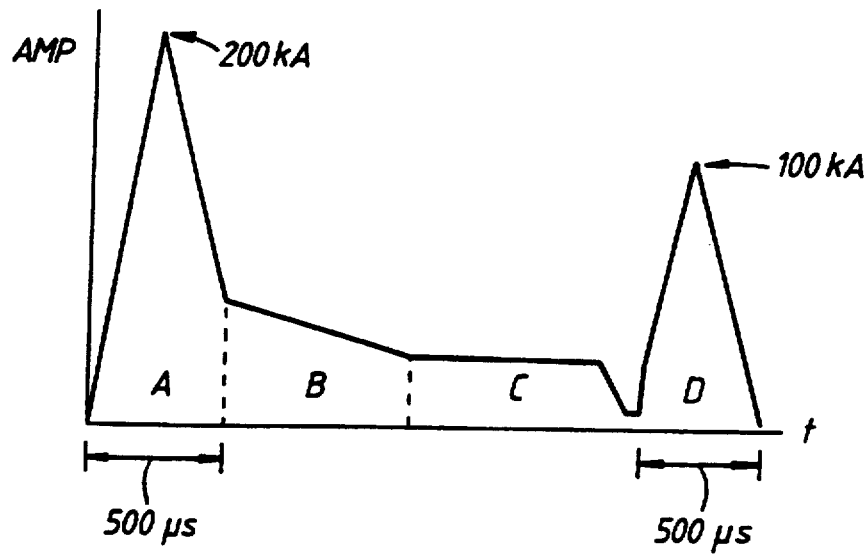
Figure 3A:
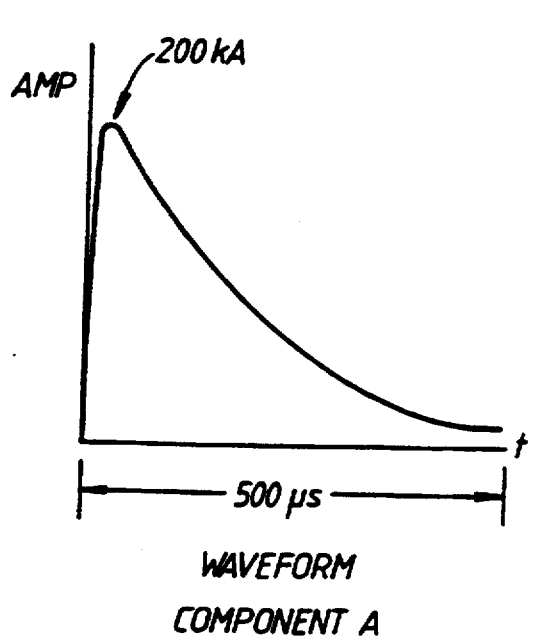
Figure 3B:
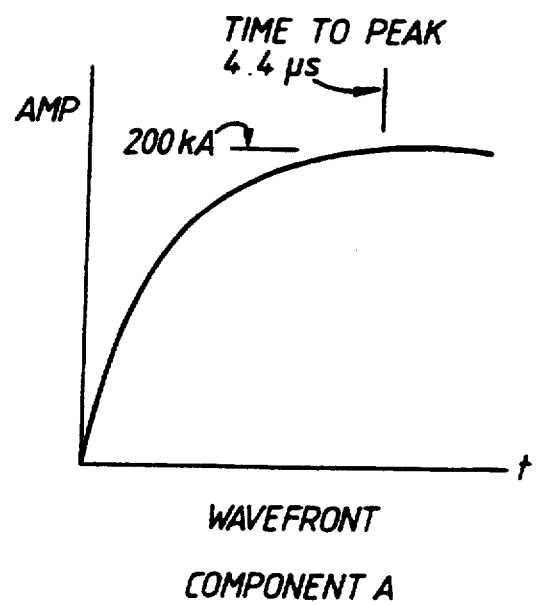
Figure 4:
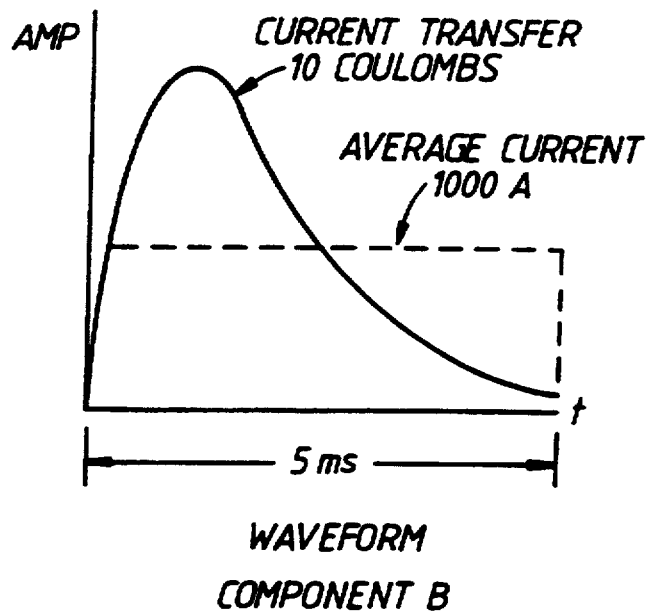
Figure 5:
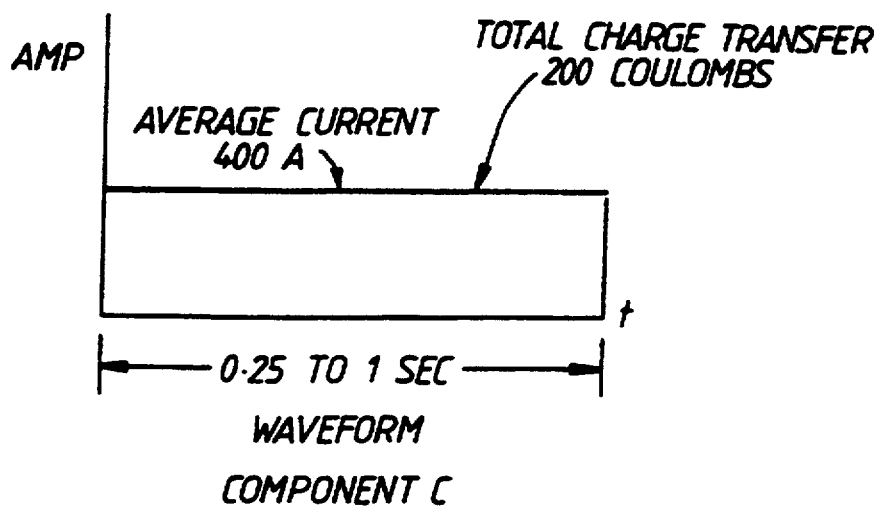
Figure 6A:
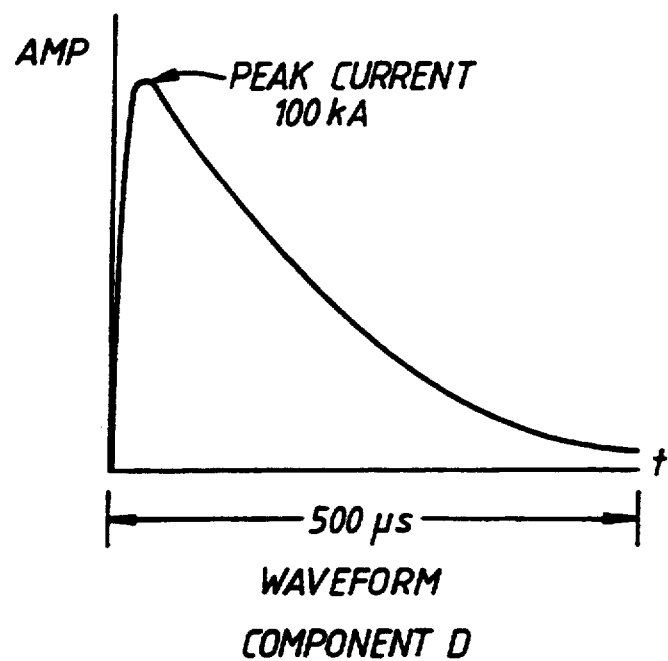
Figure 6B:
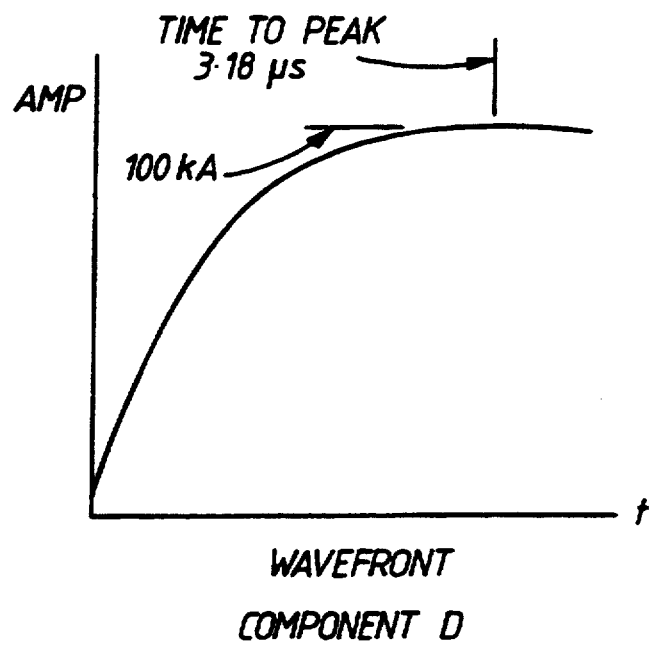
Figure 7:
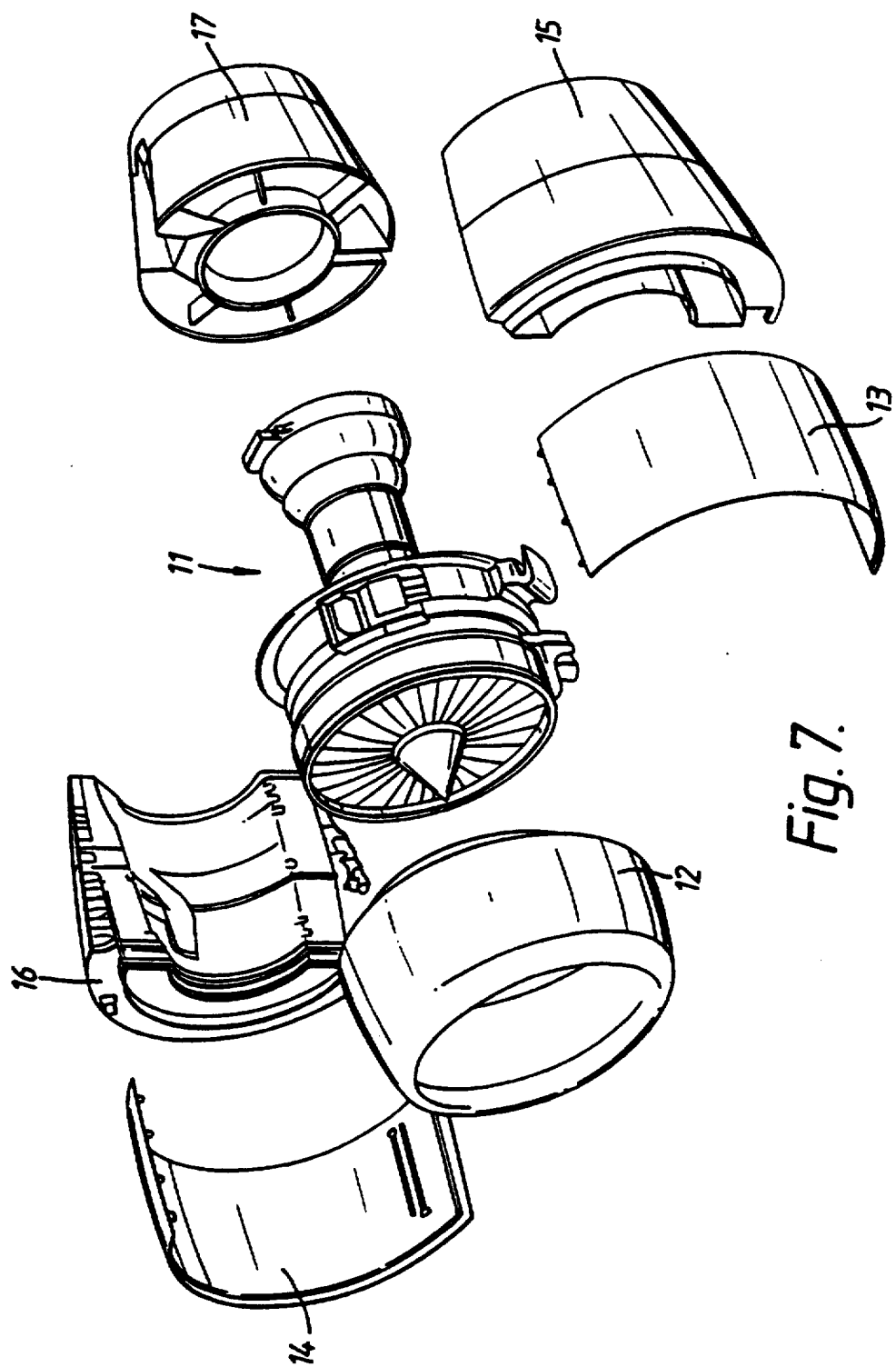

FIG. 2 is a schematic diagram of current flow during a lightning strike, illustrating peak amplitude and time duration of test current components A, B, C and D, FIGS. 3A and 3B are schematic representations of the waveform and wavefront of the current component A, FIG. 4 is a schematic representation of the waveform of the current component B, FIG. 5 is a schematic representation of the waveform of current component C, FIGS. 6A and 6B are schematic representations of the waveform and wavefront of current component D, FIG. 7 is an exploded schematic perspective view of an aircraft engine and its nacelle including left hand and right hand fan cowl doors.

Figure 8:
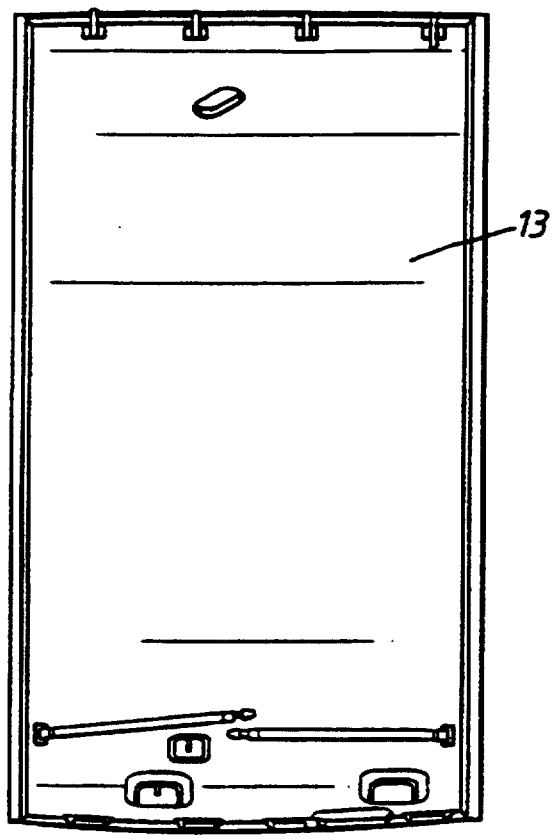
Figure 9:
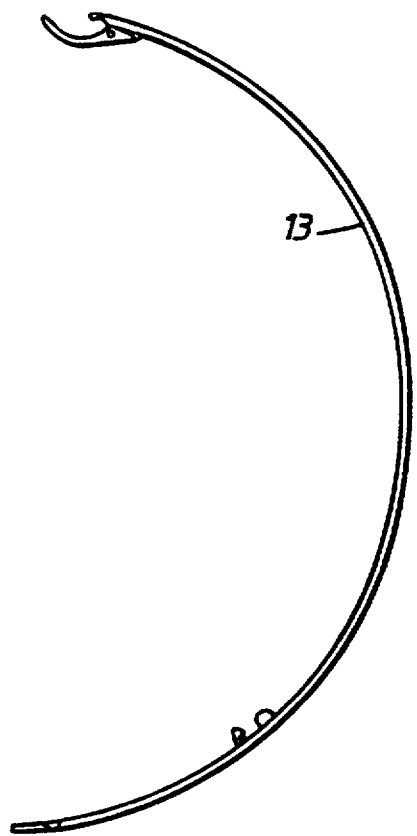

FIG. 8 is a schematic side elevation of one of the fan cowl doors of the engine nacelle shown in FIG. 7, FIG. 9 is a schematic end view of the fan cowl door shown in FIG. 7, FIG. 10 is a schematic section through a central part of the fan cowl door shown in FIGS. 8 and 9, FIG. 11 is a schematic cross-section through the fan cowl door shown in FIGS. 8 and 9 along an edge of the door, Referring first to FIGS. 1A and 1B, the aircraft illustrated and shown in general form has been cross hatched in accordance with the key also illustrated to show the lightning strike zones of the aircraft surface areas and structures according to their vulnerability to lightning strikes. As will be seen, the nose of the fuselage, the engine nacelles and the mid-regions and the tips of the wings of the aircraft are designated as zones 1A. From this illustration, it will be seen that the engine fan cowl doors to be described with reference to FIGS. 7 and to 11 and formed from a structural component according to the invention fall within a zone 1A designation.

As to the current components A to D which simulate in tests current flow in a lightning strike, peak amplitudes and duration are shown in graphical form in FIG. 2, the initial component A having a peak amplitude of 200 kA and a time duration of 500 $\mu$s, the intermediate current component B having an average amplitude of 2 kA and a time duration of 5 ms, the continuing current component C having a steady amplitude of 200 A to 300 A and a time duration of 0.25 to 1 sec and the restrike component D having a peak amplitude of 100 kA and a time duration of 500 $\mu$s. As is apparent, current components A and D have high peak amplitudes and are of short duration relative to components B and C.

The waveforms and wavefronts of the four current components A to D are graphically represented in FIGS. 3A, 3B, FIGS. 4 and 5 and FIGS. 6A and 6B.

The current components A to D are applied in tests individually or as a combination of two or more components together and the structural component for the fan cowl doors hereinafter to be described with reference to FIGS. 7 to 11 are required to withstand prescribed tests under simulated current components A and D.

Referring now to FIGS. 7, an engine and nacelle configuration for an aircraft as represented in FIGS. 1A and 1B comprises a core engine 11 enclosed in a nacelle comprising a nose cowl 12, left and right hand hinged fan cowl doors 13 and 14, central cowl half sections 15 and 16 and a common nozzle assembly 17. The fan cowl door 13 is further illustrated in side elevation and end view in FIGS. 8 and 9.

The fan cowl doors 13 and 14 are zone 1A surfaces and must satisfactorily remain protective under current components A and D. To achieve this, they are advantageously fabricated from a structural component according to the invention and as now to be described with reference to FIGS. 10 and 11.

Referring now to FIG. 10, the schematic section of the fan cowl door 13 is taken at a central part of the door and illustrates the structural component configuration according to the invention. The component comprises a honeycomb core part 18 formed by wall portions 19 which extend across the core part 18 from a front face 20 to a rear face 21 and which provide bounding surfaces for an array of open ended juxtaposed cells. The core is fabricated from an aluminium alloy and as a consequence is electrically conducting. While an aluminium alloy is preferred other lightweight non-ferrous alloys may if desired be used.

Bonded to the front face 20 of the core part 18 is a facing component part 22 formed by superposed sheets layers and plies. The outer most sheet 23 is electrically conducting and is formed as a metal or metal alloy expanded foil which can conveniently be an aluminium alloy or copper expanded foil although other lightweight non-ferrous metals or metal alloys may be used.

Immediately beneath the metal foil 23 is an electrically non-conducting sheet 25 bonded to the metal foil 23 by an adhesive layer 24. The electrically non-conducting sheet 25 is a woven glass fibre fabric. While glass fibre is preferred other electrically non-conducting fibres may if desired be used and the reinforcement may if desired be in a form other than woven.

Immediately beneath the glass fibre fabric sheet 25 is a plain weave (0°-90°) graphite fibre reinforced composite sheet 26 followed by a unidirectional (0°) graphite fibre reinforced composite sheet 27, a further plain weave (0°-90°) graphite fibre reinforced composite sheet 28 and two plies of adhesive 29 and 30 which secure the sheet 28 to the core part 18. The graphite fibre reinforced composite sheets 26 and 28 may if desired be replaced by aramid fibre reinforced composite sheets and the reinforcement may of course take forms other than a plain weave (0°-90°). The unidirectional graphite fibre reinforced sheet 27 may if desired also be substituted by a graphite fibre reinforcement of a different configuration.

The rear face 21 of the core part 18 is closed off by a rear component part 31 formed by a multiplicity of superposed and bonded sheets, layers or plies in which a glass scrim 33 is bonded to the rear face 21 by an adhesive ply 32 and has superposed upon it a plain weave (0°-90°) graphite fibre reinforced composite sheet 34 followed by a unidirectional (0°) graphite fibre reinforced sheet 35 and a further plain weave (0°-90°) graphite fibre reinforced composite sheet 36. The glass scrim 33 is employed in the rear component part 31 as a barrier to reduce carbon to aluminium corrosive effects.

Referring now to FIG. 11, the section shown of the door 13 is at a door edge. To the right in the drawings it is of the same construction as the central section shown in FIG. 10. It comprises the core part 18 and a smaller cell size core part 18¹ having front faces 20 and 20¹ and rear faces 21 and 21¹. Front and rear component parts 22 and 31 take the same form as the parts 22 and 31 of the section shown in FIG. 10 but combine at the edge of the door to form a superposed layer formation in which a glass scrim 33 is secured by an adhesive layer 32 to the front faces 20 and 20¹ of the core parts 18 and 18¹ and terminates at the end of the core part 18¹, four further plain weave (±45°) graphite fibre reinforced composite sheets 38 of 8-H fabric are interposed as illustrated and a metal expanded foil 37 added as a rearmost layer by bonding to the composite sheet 36 using a ply of adhesive (not shown).

The embodiment of the invention hereinbefore described with reference to FIGS. 7 to 11 provides a suitable structure for use on an aircraft engine nacelle, capable of withstanding a direct lightning strike and offering a further protection to electronic or electrical systems from indirect effects. As well, the structure will contribute to providing acceptable attenuation to resist high intensity radiated fields and will provide full protection to meet the Federal Aviation Authority, British Civil Airworthiness Authorities and the Joint Airworthiness requirements for fireproofing, i.e. exposure to direct flame at 2000° F. for 15 minutes.

The structural component hereinbefore described with reference to FIGS. 7 to 11 is made from graphite fibre composite and an aluminium alloy honeycomb, interleaved with a glass fibre fabric of a predetermined thickness and at a predetermined position within a bonded assembly, and faced with a metal or metal alloy expanded foil. Together these provide resistance to a primary strike coupled with resistance to indirect effects and protection against high intensity radiated fields, coupled with fireproofing resistance.

The protective efficiency of the structural component is based firstly on the location of the glass fibre fabric sheet within the assembly, secondly on the material type and thickness of it, and finally the combination of these when used in conjunction with other defined materials in a bonded composite structure, using an aluminium honeycomb core, to form a fireproofing structure.

The glass fibre fabric sheet 25 should preferably be positioned immediately below the metal or metal alloy expanded foil and its adhesive and immediately on top of the outermost graphite fibre reinforced sheet 26 in order for the component to be technically and weight effective.

An important aspect of the present invention is the specific use of a glass fibre interlayer coupled with an external metal or metal alloy expanded foil, on top of the initial layer of graphite fibre reinforced sheet 26. It is the use of these materials at the external surface of the component which provides the protection which leads to structural and systems integrity.

A combination of a glass fibre fabric with other defined materials in predetermined relative positions, can provide a fibre reinforced bonded honeycomb assembly with adequate protection against a primary lightning strike i.e. Zone 1A, current component A. It can furthermore provide protection against voltage differentials and electromagnetic fields, caused by indirect lightning strike effects i.e. Zone 1A, current component D. It can also provide resistance to structural penetration from a primary lightning strike, thereby providing attenuation of radiated field interference at high frequency.

The use of a glass fibre fabric sheet of a predetermined thickness within the fibre reinforced bonded honeycomb assembly leads to an optimised structure in terms of weight and stiffness.

The combination of a glass fibre fabric sheet with other materials, especially an aluminium honeycomb core to form a carbon, graphite or aramid fibre reinforced bonded honeycomb assembly, will also provide protection against full fireproofing requirements of the certification agencies, i.e., CAA, FAA, JAA, i.e., exposure for 15 minutes to a "standard flame" at 2000° F. without fire penetration.

The structural component as hereinbefore described with reference to FIGS. 10 and 11 provides a lightweight composite bonded structure which meets three of the most stringent requirements of aircraft airworthiness authorities i.e. lightning strike resistance, resistance to high intensity radiated fields and fireproofing.

It will be appreciated that the dimensions of the principal components of the fan cowl door 13 described with reference to FIGS. 10 and 11 will need to be so chosen as to provide the required protection against lightning strikes while at the same time optimising the conflicting requirements of weight and stiffness.

It will furthermore be appreciated that, the construction of the door 13 as described with reference to FIGS. 10 and 11 can be carried out using any one of a variety of assembly techniques. For example, the sheets and core parts forming the door 13 may be arranged in their juxtaposed positions as illustrated in FIGS. 10 and 11 employing a lay up sequence and the completed assembly cured in an autoclave to produce the bonded structure. Curing of the assembly would normally be carried out at a relatively low pressure of 33 psi.

It has however been found that the required characteristics for the door structure, that is to say, (i) the protection it provides against lightning strikes (ii) the protection it provides against fire (iii) its weight and (iv) its stiffness can be optimised by (a) precuring a facing sheet consisting of the glass fibre fabric sheet 25, the graphite fibre reinforced composite sheets 26 to 28 and 38, (b) applying the metal or metal alloy expanded foil 23 to the exposed face of the sheet 25 of the precured facing sheet and bonding it thereto at a pressure of the order of 85 psi in an autoclave to form a sub-assembly and (c) then applying the sub-assembly to the honeycomb core parts 18 and $18^1$ and an uncured backing sub-assembly of fabric reinforced composite sheets to the rear of the core parts 18 and $18^1$ and autoclaving at a pressure of the order of 33 to 40 psi to form the complete bonded structure.

In the embodiment of the invention described with reference to FIGS. 10 and 11, a metal or metal alloy expanded foil 23 lies in the exposed external surface of the fan cowl door 13. While the use of a metal or metal alloy expanded foil is to be preferred as a means of achieving optimum characteristics for the door, the foil may be replaced by a metal or metal alloy wire mesh where the same lightning strike protection can be achieved but only at an additional weight penalty. Expanded foils are however preferred to wire mesh in that they provide good radiated field attention at high frequencies.

We claim:

1. An aircraft structural component comprising an assembly of:
   (i) an electrically conducting first component part having a cellular structure and a front face; and
   (ii) a second component part extending across the front face of the first component part, the second component part comprising:
      (a) an outer electrically conducting first sheet; and
      (b) an electrically non-conducting second sheet which is positioned at the rear of the first sheet and which is formed by a fabric constructed from electrically non-conducting fibres; and
      (c) a fibre reinforced composite third sheet at the rear of the second sheet and positioned between the second sheet and the front face of the first component part, wherein the fibre reinforced composite third sheet comprises carbon or graphite fibre or aramid fibre.

2. A component according to claim 1, wherein the first sheet of the second component part comprises a non-ferrous metal or metal alloy expanded foil.

3. A component according to claim 1, wherein the second sheet adjoins the first sheet and the third sheet adjoins the second sheet.

4. A component according to claim 2, wherein the non-ferrous metal or metal alloy expanded foil comprises aluminium or copper or an aluminium or copper alloy.

5. A component according to claim 1, wherein the fibres of the fabric of the second sheet of the second component part are glass fibres.

6. A component according to claim 5, wherein the fabric of the second sheet is in woven form.

7. A component according to claim 1, wherein the first component part is formed from a lightweight non-ferrous metal or metal alloy.

8. A component according to claim 7, wherein the metal alloy is an aluminium alloy.

9. A component according to claim 1 wherein the first component part has wall portions which extend across the first component part from the front face to a rear face thereof and which provide bounding surfaces for an array of juxtaposed cells.

10. A component according to claim 1, including a backing component part which extends across a rear face of the first component part and which comprises at least one superposed fibre reinforced composite sheet.

11. An aircraft including a surface structure exposed to lightning strikes and formed by a structural component according to claim 1, with the electrically conducting first sheet of the second component part providing an outermost face exposed to lightning strikes.

12. A method of manufacturing a structural component according to claim 1 wherein the second component part is formed by bonding the electrically non-conducting second sheet to the fibre reinforced composite third sheet in a precuring step to form a precured facing sheet, and bonding the electrically conducting first sheet to the front face of the precured facing sheet and to form a facing sub-assembly.

13. A method according to claim 12 wherein the electrically conducting first sheet is autoclave bonded to the precured facing sheet at a pressure of 80–90 psi.

14. A method according to claim 13, wherein the electrically conducting first sheet is autoclave bonded to the precured facing sheet at a pressure of 85 psi.

15. A method according to claim 13, including the further step of bonding the sub-assembly to the front face of the first component part and an uncured backing assembly of composite sheets to a rear face of the first component part at a pressure in the range of 33 to 40 psi to form the structural component.

* * * * *